W. T. BUSH.
Bee-Hives.

No. 150,935.  Patented May 19, 1874.

Attest  
D. P. Cowl  
A. Moore

Inventor  
William T. Bush  
Per A. N. & R. K. Evans  
Attys.

W. T. BUSH.
Bee-Hives.

No. 150,935.

2 Sheets--Sheet 2.

Patented May 19, 1874.

Attest
D. Howl
A. Moore

Inventor
William T Bush
Per A.H. & R.K. Evans
Attys

UNITED STATES PATENT OFFICE.

WILLIAM T. BUSH, OF UNION CITY, TENNESSEE.

IMPROVEMENT IN BEE-HIVES.

Specification forming part of Letters Patent No. 150,935, dated May 19, 1874; application filed September 27, 1873.

*To all whom it may concern:*

Be it known that I, WILLIAM T. BUSH, of Union City, in the county of Obion and State of Tennessee, have invented certain Improvements in Bee-Hives; and I hereby declare the following to be a full, clear, and exact description thereof, reference being had to the accompanying drawings, in which—

Figure 1:
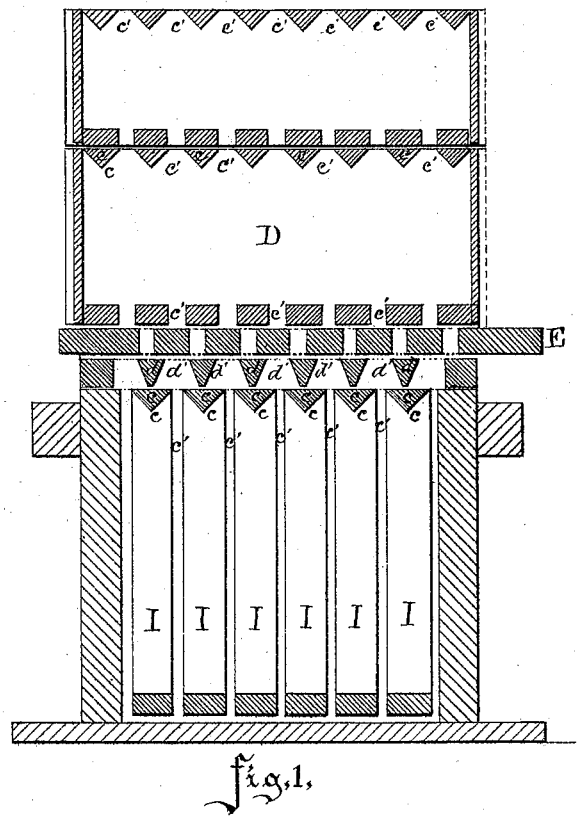
Figure 2:
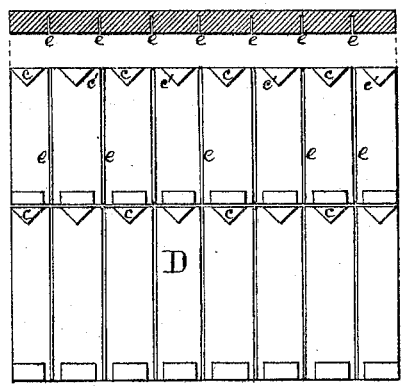
Figure 3:
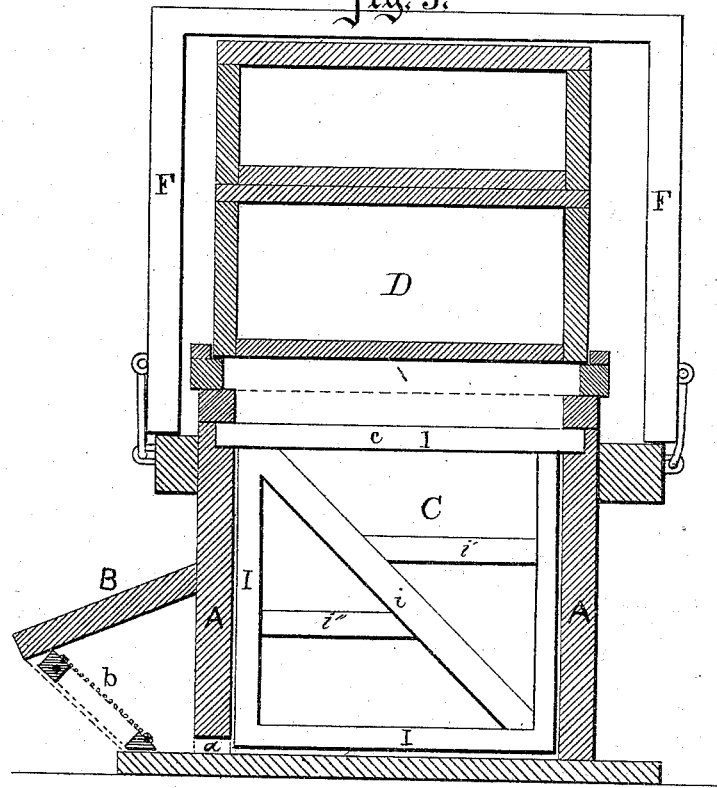
Figure 4:
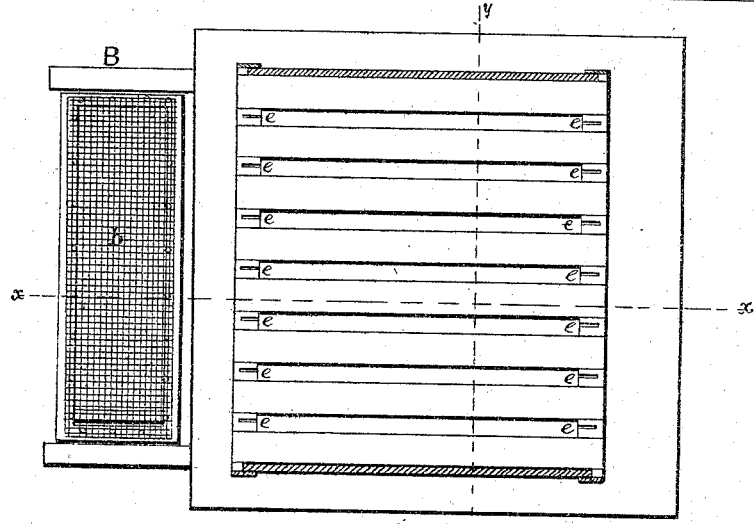

Figure 1 is a transverse vertical section on the line $y\ y$ of Fig. 4. Fig. 2 is an elevation and section of one side of the honey-chamber. Fig. 3 is a longitudinal vertical section on the line $x\ x$ of Fig. 4. Fig. 4 is a top view of my invention, with the outer covering F and the hood over the door B removed.

My invention consists, first, in a hood over the opening for the bees, and provided with a netted or perforated door, as more fully hereinafter described; second, in an improved construction of the honey-boxes, so the honey can be removed without breaking the comb.

In order that those skilled in the art may make and use my invention, I will proceed to describe the manner in which I have carried it out.

In the said drawings, A is the body of the hive, having the opening $a$ for the ingress and egress of the bees. Over this opening I construct a hood, B, having a swinging gauze-door, $b$. This hood prevents the bees being smothered by snow blocking up the opening, and shades the opening in early spring, so as to keep the sun from shining on it. If the bees come to the opening, and the direct rays of the sun fall on them, they are deceived by the temperature, take flight, and get chilled so as not to be able to return to the hive. The gauze $b$ enables me to confine the bees without affecting the ventilation, so that I can, by merely smoking the honey-box, drive them all into the brood-chamber, cut off communication, and take the honey. It is also very useful, when a colony of bees is transferred, to shut out the robber bees until the wash-honey is all cleaned up which attracts them. The brood-chamber C has its top made of strips $c\ c$, having openings between them, $c'\ c'$; and the bottom of the honey-box D is made the same way with slats $d$ and openings $d'$, the strips $c\ c$ being under the strips $d\ d$, and the openings $c'\ c'$ over the openings $d'\ d'$. Between the bottom of the honey-box and the top of the brood-chamber room enough is allowed for a sliding diaphragm, E, having strips and openings to correspond with $d\ d'$ and $c\ c'$.

When it is desired to cut off communication between the brood-chamber and honey-box, the diaphragm E is drawn out until each of its slats is between each of the openings $c'$ and $d'$, which effectually accomplishes the result without affecting or altering the position of either the honey-box or brood-chamber.

The honey-box D is constructed in a manner to facilitate the removal of the honey, as follows, (see Fig. 1:) Alternating with the strips forming the top and bottom of the box, I cut from the inside into the sides of the box, during the process of manufacture, a deep saw-kerf, $e$, leaving only about one-eighth of an inch of soft wood unsawed.

When I desire to remove the honey, I cut with a knife down the outside and sever the wood, and separate each sheet of honey in a frame without breaking a cell, the frame being formed of a top and bottom slat, and the portions of the wood between cut on each side of the box.

F is the outer casing, covering the honey-chamber, fastened by hooks to the lower section.

I construct the frames in my brood-chamber as shown in Fig. 3.

A diagonal brace, $i$, runs across the frame I, and two additional braces, $i'$ and $i''$, strengthen the frame and provide greater additional surface for the attachment of the comb.

This construction enables me to avoid two serious difficulties in the brood-chamber, viz: When the combs are large in warm weather they will warp and sag until they come so nearly in contact with each other that the bees cannot get between them to remove the moths, which, in time, will destroy the colony of bees, and it prevents the combs in the brood-chamber from being broken or displaced by agitation, and thereby enables me to transport hives with safety.

What I do claim as new, and desire to secure by Letters Patent, is—

1. The door $b$, in combination with and pendent from the front part of a hood, B, substantially as and for the purpose set forth.

2. The honey-box D, constructed with saw-kerfs on its inner sides, substantially as and for the purpose set forth.

WILLIAM T. BUSH.

Witnesses:
D. W. PURSLEY,
K. BUSH.